United States Patent
Lob

(10) Patent No.: US 6,247,847 B1
(45) Date of Patent: Jun. 19, 2001

(54) FLEXIBLE BEARING CAGE

(75) Inventor: Charles J. Lob, Oconomowoc, WI (US)

(73) Assignee: Harken, Inc., Pewaukee, WI (US)

( * ) Notice: Subject to any disclaimer, the term of this patent is extended or adjusted under 35 U.S.C. 154(b) by 0 days.

(21) Appl. No.: 09/239,621

(22) Filed: Jan. 30, 1999

(51) Int. Cl.⁷ .................................................. F16C 33/46
(52) U.S. Cl. .......................... 384/51; 384/565; 384/572; 384/577
(58) Field of Search ................................. 384/565, 569, 384/576, 532, 577, 572, 51

(56) References Cited

U.S. PATENT DOCUMENTS

| | | |
|---|---|---|
| 1,018,324 | 2/1912 | Kempster . |
| 1,080,288 | 12/1913 | Lockwood . |
| 1,173,719 | 2/1916 | Hirth . |
| 2,016,526 | 10/1935 | Tyson . |
| 2,334,227 | 11/1943 | Stallman . |
| 2,365,154 | 12/1944 | Storz . |
| 3,344,682 | 10/1967 | Bratz . |
| 3,399,008 | 8/1968 | Farrell . |
| 3,806,213 | 4/1974 | Nagai . |
| 3,920,292 | 11/1975 | Haussels . |
| 3,980,359 | 9/1976 | Wetherbee, Jr. . |
| 4,391,476 | 7/1983 | Negele et al. . |
| 4,541,819 | 9/1985 | Mazziotti . |
| 4,557,614 | 12/1985 | Knappe . |
| 4,837,909 | 6/1989 | Schalk . |
| 4,915,515 | 4/1990 | Rohrer et al. . |
| 5,001,831 | 3/1991 | Vinciguerra et al. . |
| 5,154,401 | 10/1992 | Schramm . |
| 5,156,378 | 10/1992 | Harken et al. . |
| 5,284,395 | 2/1994 | Sternberger . |

*Primary Examiner*—Lenard A. Footland
(74) *Attorney, Agent, or Firm*—Pyle & Piontek

(57) ABSTRACT

A flexible bearing retaining cage has a flexible spine with bearing retaining means for rotatably retaining bearings. A flexible bearing cage assembly comprises a flexible bearing retaining cage with bearings rotatably retained. The flexible cage of the invention may be configured in a variety of shapes including, but not limited to, linear, oval, eliptical, and circular. The cage of the invention may also be cut to a desired length to fit a particular race.

4 Claims, 4 Drawing Sheets

FLEXIBLE BEARING CAGE

FIELD OF THE INVENTION

The present invention relates to cages for rotatably retaining bearings, aligning the bearings, and for separating them from one another.

BACKGROUND OF THE INVENTION

Bearing retaining cages retain bearings such that the bearings are held in place but are allowed to freely rotate. Generally, the cages are circular or linear. In this manner a bearing cage may be used to hold bearings in alignment with one another and to keep the bearings separate from one another so that they do not rub against one another. The bearings may be contained between an inner and outer race to facilitate relative movement of one about the other. Bearing cages may also include a protruding member for alignment in a slot along a race to align the bearings and to limit their movement in a direction perpendicular to the slot.

Examples of bearing retaining cages include those as disclosed in U.S. Pat. Nos. 1,018,324 to Kempster; 2,016,526 to Tyson; 3,980,359 to Weatherbee; and 5,154,401 to Schramm. The bearing cages as disclosed in these patents and as otherwise known in the art, however, have in common heretofor unresolved problems.

Such bearing retaining cages may be difficult to install, particularly if they are circular and include a protruding member for insertion into a slot on one of the inner or outer races. Such retaining cages are typically snap fit into place. Snap fitting of the cages, however, can lead to failure of the retaining cage or of the protruding member.

Also, as many different bearing applications exist, it is required to manufacture bearing retaining cages of many different sizes. For instance, a given diameter race will require a retaining cage of that diameter. Further, for applications having a race that is not circular shaped but is instead oval or otherwise features an oddly shaped race, bearing retaining cages as presently known may not be appropriate.

There is therefor an unresolved need in industry for an improved bearing retaining cage.

OBJECTS OF THE INVENTION

It is an object of the invention to provide a bearing retaining cage that is flexible.

It is a further object of the invention to provide a bearing cage assembly having a flexible cage.

SUMMARY OF THE INVENTION

The present invention comprises a flexible bearing retaining cage for rotatably retaining bearings. The cage generally comprises a flexible spine having retaining means for rotatably retaining bearings. The present invention further comprises a flexible bearing retaining cage assembly generally having a flexible spine with bearing retaining means, and bearings rotatably retained by said means.

The flexible retaining cage of the invention has a spine preferably comprised of a resilient, deformable plastic. The flexible cage retaining means preferably comprise a plurality of notches spaced along the spine for snap fitting a plurality of roller bearings, or a plurality of annular rings for snap fitting a plurality of ball bearings. One each of the plurality of bearings is snap fit into each respective notch or ring. The bearings are held by the retaining means so as to allow for relatively low resistance rotation of the bearings. The bearings may be comprised of any suitable material, and are preferably comprised of a relatively hard, durable plastic. The flexible bearing retaining cage of the invention comprises the flexible spine with bearings snap fit into place. Snap fitting of the bearings provides for easy installation of bearings to the cage. Bearings that are snap fit in a cage also greatly improves the ease of installation of the bearings into a race as the snap fit assembly eliminates the need to handle and install each bearing individually. This is of particular advantage for applications using small bearings that may be difficult to handle.

The flexible bearing retaining cage and cage assembly of the invention provide several advantages over the cages and assemblies of the prior art. Because the cage is flexible, it may be configured in a variety of different shapes, including, but not limited to, a circle, an oval, or a straight line. Prior to the present invention, races having shapes other than circular could not use bearing retaining cages.

The spine of the cage of the present invention may protrude beyond the retained bearing surfaces so that it may be movably held in a groove on an inner or outer race. The spine movably held in the groove thereby helps to align the bearings, and to prevent bearing movement in a direction perpendicular to the direction of the groove.

Further, because it is flexible, the bearing retaining cage of the invention may be manufactured in generally bulk quantities, and then cut to a desired length to fit a race of a given size. For example, a circular race having a 10 inch circumference can be accommodated by the cage of the invention by cutting a 10 inch length from a bulk quantity. Likewise, a circular race having a 20 inch circumference may be accommodated by the cage of the invention by cutting a 20 inch length from the bulk quantity. Also, the cage of the invention may be used in applications using a linear race. In this manner, advantage may be taken of economies of scale available through manufacturing bulk quantities of the cage. Great savings will be realized by eliminating the need to manufacture and stock a number of differently sized and shaped cages.

Also, the flexible cage of the invention provides for easier installation to a race than cages of the prior art. Using the cage of the invention, the flexible spine with bearings snap fit into place may be easily fed into or wrapped about a race where it will bend to follow the shape of the race. When a sufficient length of the cage has been fed or into or wrapped about the race, it can be cut. This eliminates the need to snap fit a cage and the frequent breakage that accompanied such snap fitting.

The above brief description sets forth rather broadly the more important features and advantages of the present disclosure so that the detailed description that follows may be better understood, and so that the present contributions to the art may be better appreciated. There are, of course, additional features of the disclosure that will be described hereinafter which will form the subject matter of the claims appended hereto. In this respect, before explaining the embodiment of the disclosure in detail, it is to be understood that the disclosure is not limited in its application to the details of the construction and the arrangements set forth in the following description or illustrated in the drawings. The present invention is capable of other embodiments and of being practiced and carried out in various ways, as will be appreciated by those skilled in the art. Also, it is to be understood that the phraseology and terminology employed herein are for description and not limitation.

DETAILED DESCRIPTION

Figure 1:
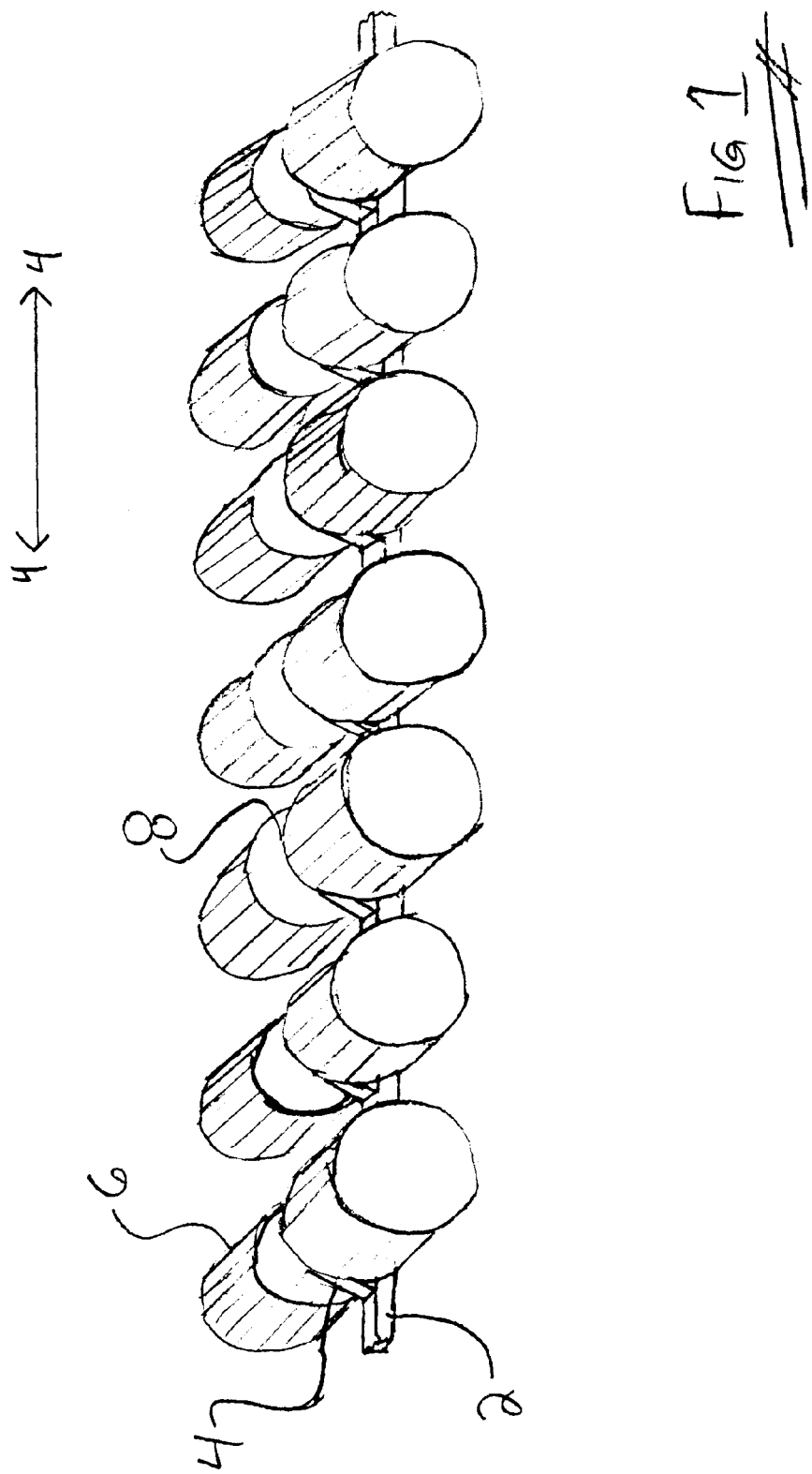
FIG. 1 is a perspective of a preferred embodiment of the invention.

Turning now to the drawings, FIG. 1 is a perspective of a preferred flexible bearing cage assembly embodiment of the invention. Flexible spine 2 has a plurality of resilient notch arms 4 which define a notch therebetween for snap fitting roller bearings 6. Roller bearings 6 have an annular recessed ring 8 about their center for receiving notch arms 4. Roller bearings 6 are rotatably held in place between notch arms 4, so that they may freely rotate.

Figure 2:
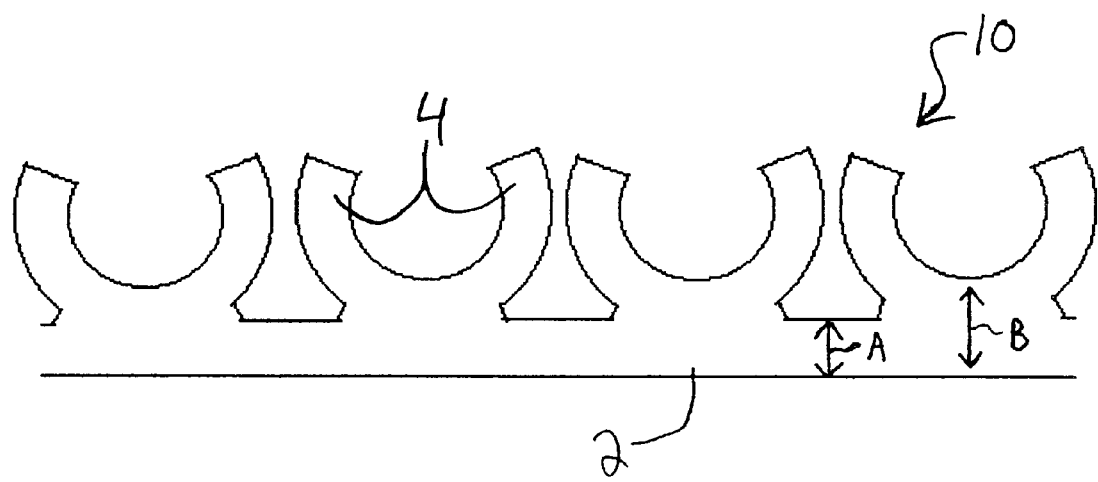
FIG. 2 is a transverse view of the preferred retaining cage of the invention.
Figure 3:
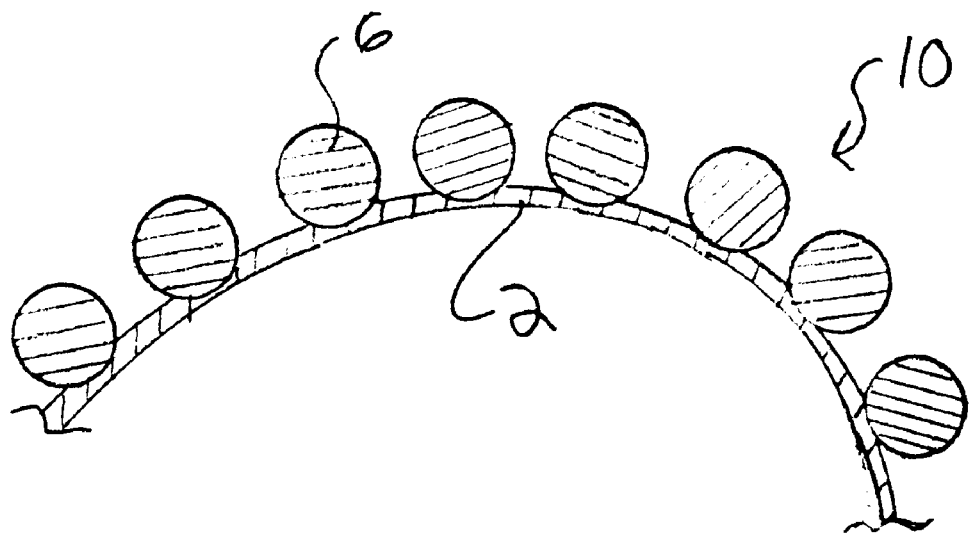
FIG. 3 is a transverse view of the preferred cage assembly of the invention.

FIG. 2 is a transverse view of the preferred flexible cage 10 of the invention with flexible spine 2, and with notch arms 4 for receiving roller bearings therebetween. FIG. 3 is a transverse view of preferred flexible cage 10 bent in an arcuate shape with roller bearings 6 snap fit into place about spine 2. As discussed infra, flexible spine 2 may be bent to form a variety of shapes, including, bot not limited to, circular, linear, elliptical, angular, and oval; and may be cut from bulk to a desired length to fit a race of a given dimension.

As shown generally in FIG. 2, it is preferred that spine 2 has a thickness that is smaller in the region between notches than it is in the region below the notches. FIG. 2 identifies spine 2 thickness between notches as A, and spine thickness below notches as B. A smaller A dimension than B dimension insures that as spine 2 is bent, bending will occur in the region between notches, and not below the notches. This will prevent the spine retaining arms 4 from separating and thereby releasing the roller bearings 6.

Figure 4:
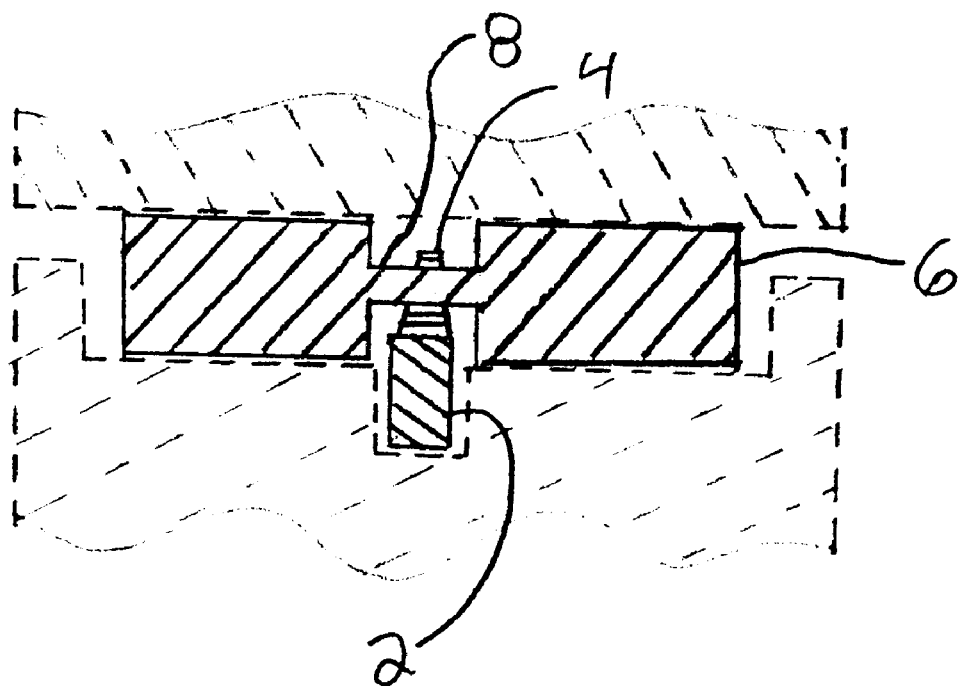
FIG. 4 is a cross sectional view of the preferred cage assembly of the invention installed between an inner and an outer race.

FIG. 4 is a cross section of the preferred cage assembly of FIG. 1 taken along the line 4—4, with the cage assembly operatively installed between an outer and inner race (races shown in broken line). Flexible spine 2 is movably held in a slot in the inner race so as to help align roller bearings 6. Roller bearing 6 has annular recessed ring 8 for receiving spine notch arms 4. Roller bearing 6 is rotatably held in place by arms 4 to allow for relatively low resistance rotation.

Flexible spine 2 is preferably comprised of a plastic material allowing for flexibility with good durability. A preferred material of construction is acetal plastic, available under the tradename Delrin from the DuPont Corp. The flexible cage may also be comprised of metal. Spine 2 is preferably laser cut from sheets of plastic material. Notch arms 4 should be deformable, but resilient. Roller bearings 6 should be comprised of a durable, relatively hard material to offer low resistance when rolling between an inner and outer race. Preferred materials of construction for bearings 6 include Delrin plastic. Bearings 6 may also be comprised of metal.

In addition to the preferred embodiment generally illustrated in FIGS. 1–4, other embodiments are within the scope of the claimed invention, as will be recognized by those skilled in the art. In particular, embodiments featuring alternate bearing retaining means and alternate bearings, including, but not limited to, ball bearings snap fit and retained in annular rings, are encompassed by the claims.

The advantages of the disclosed invention are thus attained in an economical, practical, and facile manner. While a preferred embodiment has been shown and described, it is to be understood that various further modifications and additional configurations will be apparent to those skilled in the art. It is intended that the specific embodiments and configurations herein disclosed are illustrative of the preferred and best modes for practicing the invention, and should not be interpreted as limitations on the scope of the invention as defined by the appended claims.

What is claimed is:

1. A flexible bearing cage comprising:

a) a flexible spine having a plurality of notches for snap fitting and rotatable retaining roller bearinos; said spine having a plurality of first regions between said plurality of notches, each of said first regions having a substantially equal thickness, and a plurality of second regions below said notches, each of said second regions having a substantially equal thickness; wherein said first region thickness is less than said second region thickness, whereby flexing of said flexible bearing case causes bending of said first region while said second region remains substantially unbent and said notches thereby remain substantially closed for movably holding said roller bearings therein.

2. A flexible bearing cage assembly for rotation about a raceway, the raceway having a groove; the flexible cage assembly comprising:

a) an operably flexible spine having a plurality of notches for rotatably retaining a plurality of roller bearings, one each of said plurality of roller bearings rotatably held in one each of said plurality of notches, said operably flexible spine with said roller bearings retained therein for rotation about the raceway; said operably flexible spine having a degree of flexibility great enough such that said spine may operably rotate about raceways of different sizes and shapes, including, but not limited to, substantially oval raceways. substantially elliptical raceways, different circular raceways of substantially different circumferences, and a substantially linear raceway;

b) said operably flexible spine having a plurality of first regions, one each of said plurality of first regions located between each of said plurality of notches; said operably flexible spine having a plurality of second regions, one each of said plurality of second regions substantially below each of said plurality of notches; said first regions having a thickness less than said second regions whereby operational flexing of said operably flexible spine substantially occurs through flexing of said first regions while said second regions remain substantially un-bent with said plurality of notches thereby remaining substantially static during operational flexing of said spine; and c) said operationally flexible spine having a protruding portion movably received in the raceway groove thereby restricting axial movement of said operationally flexible spine.

3. A flexible bearing cage assembly for rotation about a raceway, the flexible cage assembly comprising: an operably flexible spine having a plurality of retaining means for rotatably retaining a plurality of bearings, one each of a plurality of bearings rotatably held in one each of said retaining means, said operably flexible spine with said bearings retained therein for rotation about the raceway, said operably flexible spine having a degree of flexibility great enough whereby said spine may operably rotate about raceways of different sizes and shapes, including, but not limited to, substantially oval raceways, substantially elliptical raceways, different circular raceways of substantially different circumferences, and a substantially linear raceway, and wherein the raceway further comprises a groove, and wherein said operably flexible spine comprises a protruding portion, said protruding portion movably received in said raceway groove.

4. A flexible bearing cage assembly as in claim 3, wherein said flexible bearing cage has a plurality of first regions between said notches, and a plurality of second regions below said notches, said second regions substantially thicker than said first regions whereby operational flexing of said flexible cage occurs through bending of said first regions while said second regions remain substantially un-bent and said notches thereby remain substantially un-deformed for movably retaining said roller bearings.

* * * * *